(12) United States Patent
Yokoyama et al.

(10) Patent No.: US 8,198,835 B2
(45) Date of Patent: Jun. 12, 2012

(54) CORDLESS POWER TOOL AND BATTERY DEVICE USED FOR SAME

(75) Inventors: Kousei Yokoyama, Ibaraki (JP);
Kazuhiko Funabashi, Ibaraki (JP);
Katsuhiro Oomori, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 797 days.

(21) Appl. No.: 12/280,957

(22) PCT Filed: Feb. 28, 2007

(86) PCT No.: PCT/JP2007/054365
§ 371 (c)(1),
(2), (4) Date: Aug. 27, 2008

(87) PCT Pub. No.: WO2007/102521
PCT Pub. Date: Sep. 13, 2007

(65) Prior Publication Data
US 2009/0237012 A1 Sep. 24, 2009

(30) Foreign Application Priority Data
Feb. 28, 2006 (JP) .................. P2006-051529

(51) Int. Cl.
*H02P 1/00* (2006.01)
(52) U.S. Cl. ......... 318/139; 320/112; 320/116; 320/134
(58) Field of Classification Search ............ 318/400.01, 318/599, 811, 62, 400.26, 400.27, 727, 812, 318/280, 503, 504, 650, 139; 320/134, 106, 320/112, 116, 107, 127, 128
See application file for complete search history.

(56) References Cited

U.S. PATENT DOCUMENTS

| | | | |
|---|---|---|---|
| 5,783,327 A | 7/1998 | Mendolia | |
| 6,324,339 B1* | 11/2001 | Hudson et al. | 388/809 |
| 7,145,314 B2* | 12/2006 | Aradachi et al. | 320/150 |
| 7,417,405 B2* | 8/2008 | Carrier et al. | 320/116 |
| 7,508,171 B2* | 3/2009 | Carrier et al. | 320/138 |
| 7,688,028 B2* | 3/2010 | Phillips et al. | 320/114 |
| 2003/0096158 A1* | 5/2003 | Takano et al. | 429/90 |
| 2004/0232892 A1* | 11/2004 | Aradachi et al. | 320/150 |
| 2005/0248309 A1 | 11/2005 | Denning | |
| 2005/0280393 A1* | 12/2005 | Feldmann | 320/114 |

FOREIGN PATENT DOCUMENTS

| | | |
|---|---|---|
| EP | 0528478 A1 | 2/1993 |
| JP | 2001/229891 | 8/2001 |

* cited by examiner

*Primary Examiner* — Walter Benson
*Assistant Examiner* — Antony M Paul
(74) *Attorney, Agent, or Firm* — McDermott Will & Emery LLP

(57) ABSTRACT

A power tool, having attached thereto a battery device including one or a plurality of cell assemblies, includes a motor which is supplied with a DC current from the battery device, a switching element which controls a drive and a stop of the motor, means which detects a number of cell assemblies, and control means which controls the switching element in such a way as to stop the drive of the motor when the number of cell assemblies is smaller than a prescribed value.

8 Claims, 10 Drawing Sheets

CORDLESS POWER TOOL AND BATTERY DEVICE USED FOR SAME

TECHNICAL FIELD

The present invention relates to a battery device using a stackable cell assembly technology (hereafter abbreviated as SCAT) and a cordless power tool using the battery device.

BACKGROUND ART

First of all, a description will be given, using FIGS. 1A-1D, of a concept of the SCAT which the present inventor proposes.

A cordless power tool, such as a power screwdriver, a power drill or an impact tool, including a motor which generates a rotational power, is configured in such a way as to, after causing a deceleration mechanism to reduce a rotating speed of the motor, transmit the rotational power to a tipped tool.

In FIG. 1A, 20 depicts a cordless power tool, which is configured of a main body 20A and a handle 20B. A tool 30 is attached to a leading end of the main body 20A. An end of the handle 20B is connected to the main body 20A, and a battery device 10 is attached to the other end.

For all such cordless power tools, a rated voltage (volt, hereafter abbreviated as V) and a current capacity (ampere hour, hereafter abbreviated as Ah) are set by their maker. The rated voltage (V) is determined based on a size of a rotational power transmitted to the tool and a voltage necessary to drive a motor which generates the rotational power. Also, the current capacity (Ah) is determined based on a size of a load current of the motor and a specification of a time for which the tool can be used continuously. For example, a power tool having a battery device of 3 Ah attached thereto has a property which can supply a current of 3 A to the motor continuously for one hour.

Such a rated voltage and a current capacity are determined for every tool by the maker, and a user is not at liberty to change or alter their values.

In response to this, the SCAT proposes a new concept power tool configured in such a way that, although the rated voltage (V) is determined by the maker, the user can optionally select the current capacity (Ah).

This kind of new concept is desirable in that a variety of user needs can be met with one cordless power tool. For example, when using a power tool in a narrow space in a ceiling or the like, the user will desire that the power tool is as light in weight as possible rather than being large in size. However, nearly half a weight of the hitherto known cordless power tool is occupied by a cell pack, that is, the battery device and, as the power tool is manufactured in such a way that only a cell pack appropriate to the rated voltage and current capacity of the power tool is attachable to it, it is impossible to change the weight of the power tool in any operation.

Meanwhile, when carrying out the same operation continuously for a long time, the user will desire a power tool which can be used without charging the cell pack frequently. However, in the hitherto known power tool, as the current capacity is set in advance, it is impossible to use a cell pack of which a value of the current capacity differs according to the operation.

As there are many models of cordless power tool, of course, it is possible to use a tool whose specifications differ according to the operation, but the user will not desire to prepare a large number of power tools or carry them along to an operation site.

The SCAT meets such a variety of user needs. A description will be given of a difference between the hitherto known battery device and the battery device using the SCAT, by suggesting an example in which the rated voltage of the power tool is 18V and the current capacity is 3 Ah.

FIG. 1B shows a configuration of a hitherto known battery device in a case of using a nickel-cadmium cell having a nominal voltage of 1.2V as a battery cell. The battery device is configured by connecting 15 cells C1 to C15 in series and housing them in a cell pack container 10A.

Meanwhile, in a case of using a lithium cell as the battery cell, as the lithium cell has a low nominal voltage of 3.6V and a high current capacity of the order of 1.5 Ah, as shown in FIG. 1C, by connecting five cells C11 to C15 connected in series and five cells C21 to C25 similarly connected in series, a total of 10 battery cells are housed in a cell pack container 20A, configuring the battery device.

In response to this, in a case of using the SCAT, as shown in FIG. 1D, the maker prepares a cell assembly housing a number of cells necessary to generate a rated voltage of the cordless power tool. For example, in a case of configuring a cell assembly with lithium cells, a cell assembly 100A is configured by serially connecting five battery cells C11 to C15 having a nominal voltage of 3.6V and housing them in a container. In the same way, a cell assembly 100B is configured by connecting battery cells C21 to C25 in series and housing them in an assembly container. The cell assemblies 100A, 100B, . . . 100N are configured in such a way as to be connected in parallel when stacked one on another.

The user, when using one cell assembly, can use it as a 1.5 Ah battery device and, when using two cell assemblies, can use them as a 3 Ah battery device. That is, it is possible for the user to selectively determine a value of the current capacity (Ah) of the cordless power tool.

In order to manufacture a cell assembly using the SCAT, it is desirable to use a lithium cell having a high normal voltage and a low current capacity as a cell. The reason for this is that it reduces a weight of the cell assembly and enables a user's more precise selection of the current capacity.

As used herein, the lithium cell refers to a lithium vanadium pentoxide cell, a lithium manganese dioxide cell and the like, all of which, using a lithium aluminum alloy at a negative electrode, use an organic electrolyte solution. Also, a lithium ion cell generally, using a lithium cobalt oxide at a positive electrode, uses an organic electrolyte solution as an electrolyte solution. In the present specification, for the sake of convenience, an organic electrolyte solution secondary cell including the lithium cell and the lithium ion cell is collectively referred to simply as the lithium cell.

As a hitherto known technology similar to the SCAT, a battery device has already been proposed or developed which is configured in such a way that a plurality of chargeable cells can be connected in parallel, for example, in a portable electronic instrument such as a camera or a personal computer. For example, in Patent Document 1, a cell pack is disclosed which, being used in a camera and the like, enables an attachment thereto of a desired number of auxiliary cells in addition to a main cell. However, in a case of the cordless power tool, as there are technical problems of a different nature from those of office automation equipment and the portable instrument, in order to develop a power tool battery device using the SCAT, it is necessary to solve the technical problems.

First, a description will be given, with reference to FIGS. 2A and 2B, of an example of the hitherto known cordless power tool.

FIG. 2A shows an external appearance of the hitherto known cordless power tool, and FIG. 2B shows an outline of an electrical circuit of the power tool. A power tool 20 such as a power screwdriver, a power drill or a power wrench, including a main body 20A and a handle 20B connected to the main body 20A, has a battery device 10 attached to an end of the handle 20B.

A DC motor 201, which generates a rotational power, and a deceleration mechanism 202, which reduces a rotating speed of the DC motor 201, are housed in a housing of the main body 20A, and a tipped tool 30 such as a drill or a screwdriver is attached to a leading end of the deceleration mechanism 202. In a case of an impact tool, an impact mechanism (not shown), such as a hammer, is provided between the deceleration mechanism 202 and the tipped tool 30. Also, a trigger 203 is provided in the vicinity of a connection between the main body 20A and the handle 20B.

As shown in FIG. 2B, a trigger switch 203A, the motor 201 and a switching element 205 such as an FET are connected in series between both terminals of the battery device 10. A pulse signal having a pulse width modulated by a control circuit 204 is applied to a gate of the switching element 205. Also, a variable resistor 203B of which a resistance value varies in response to an operation of the trigger switch 203A is connected to the control circuit 204, and a configuration is such that a pulse width of an output pulse of the control circuit 204 varies as the resistance value is changed.

At this point, by pulling the trigger 203 in FIG. 2A, the switch 203A in FIG. 2B is closed, and a drive voltage is applied to the motor 201 from the battery device 10 for only a period in which the switching element 205 is on, rotating the motor 201. The rotational power is transmitted to the tipped tool 30 via the deceleration mechanism 202.

By further pulling the trigger 203, the resistance value of the variable resistor 203B varies. By this means, the pulse width of the pulse applied to the gate of the switching element 205 from the control circuit 204 increases. For this reason, a time for which the switching element 205 is on increases, and an average value of the drive voltage applied to the motor 201 increases. Consequently, the rotating speed of the motor 201 can be controlled in accordance with a pulling amount of the trigger 203, and it is possible to control a size of the rotational power transmitted to the tipped tool 30. By switching a switch 206 connected to both ends of the motor 201, it is possible to switch a forward and a backward rotation direction of the motor.

[Patent Document 1] JP-A-2001-229891

DISCLOSURE OF INVENTION

According to a study by the inventor, when the battery device using the heretofore described SCAT is used in the heretofore described kind of cordless power tool, the following technical problems can be expected to occur.

(1) Measures Against Overcurrent

The battery device 10 of the cordless power tool 20 is used as a power supply which supplies the drive voltage of the motor 201, and the motor 201 is used to generate the rotational power transmitted to the tool 30. As the tipped tool 30, although a drill or a screwdriver is suggested as an example thereof, is used to process a workpiece, a large fluctuation such as cannot occur in a camera or a personal computer occurs in a size of a load imposed on the tool 30. When the fluctuation of the load imposed on the tool 30 is large, naturally, a fluctuation in a load current of the motor 201 is also large and, consequently, there is a risk that an overcurrent flows through the battery device 10 too.

At this point, when a terminal voltage of the battery device 10 is designated by V, a back electromotive force of the motor 201 by E, and an armature resistance of the motor 201 by Ra, a current Ia flowing through an armature winding of the motor 201 is represented as Ia=(V−E)/Ra. Consequently, for example, when the tipped tool 30 bites the workpiece, and the rotating speed of the motor approximates 0, the back electromotive force E also approximates 0 instantaneously, and Ia may increase rapidly to the order to several tens of amperes.

Also, in a case in which cell assemblies which generate a high voltage such as 18V or 24V are connected in parallel, in the event that an unbalanced amount of charge exists between the cell assemblies, there is also a risk that the overcurrent flows. For example, when a cell assembly including five battery cells fully charged and a cell assembly including five battery cells having an amount of charge of 0% are connected in parallel, there is a possibility that a current of the order of several tens of amperes flows through a closed circuit including the two cell assemblies.

However, in a case of using, for example, a lithium cell having a current capacity of 1.5 Ah as a battery cell, when a high current of, for example, the order of 30 A flows for even a short time, there is a possibility that it damages the battery cell.

Also, in the same way, after the cell assembly including the fully charged battery cells and the cell assembly including the battery cells having the amount of charge of 0% are connected in parallel, in a case in which they are connected to a power tool body, a load of a fluctuation in the load current of the motor is imposed on one of the cell assemblies, and there is also a possibly that it damages the cell assembly itself.

In this way, in the battery device of the power tool using the SCAT, as there is a possibility that the overcurrent flows due to various causes, it is necessary to take measures against it. Particularly, in the case of using the lithium cell, as the current capacity (Ah) of the battery cell is lower than that of a nickel-cadmium cell or the like, the measures against the overcurrent are important.

(2) Selection of Assembly Appropriate to Property of Power Tool

As the cordless power tool, there are many kinds such as a power screwdriver, a power drill and a power circular saw, but a fluctuation in load varies wildly according to the kind of tool. For example, in a case of the power drill, in a condition in which a tipped tool bites a workpiece, the load current of the motor may become 6 to 7 times as high as normal. Meanwhile, in a case of an impact driver, as a load current is relatively low, a fluctuation in the load current of the motor is also relatively small. A phenomenon in which a size of the load fluctuation thus differs significantly depending on the kind of tool cannot be seen in a portable electronic instrument such as a camera or office automation equipment.

In the case of the hitherto known power tool battery device, in consideration of such a difference in load fluctuation, the rated voltage and current capacity of the cell pack are set by the maker.

However, in the case of the battery device using the SCAT, as the current capacity thereof can be selected by the user, there is also a possibility of using a cell assembly which is not appropriate to the size of the fluctuation in the load current of the power tool. Consequently, it is important to guide in such a way that the user can select an appropriate cell assembly in conformity with a kind and a property of the power tool. Such a technical problem is one peculiar to a power tool which is not found in another electric instrument such as a camera or office automation equipment.

(3) Measures Against Lengthening of Charging Time

In a case of an electronic instrument such as a camera or a personal computer, even in a case of connecting cells in parallel, when charging the cells, it is common that each of the cells is charged. However, in a case in which the battery device 10 used in the power tool is charged by a charger, each cell pack has hitherto been charged. Consequently, for example, when charging a cell pack which houses 15 nickel-cadmium cells having a nominal voltage of 1.2V, the 15 cells are charged at one time.

In response to this, the battery device manufactured by the SCAT includes a smaller number of battery cells housed in a cell assembly than the hitherto known one. Consequently, when each assembly is charged, there is a problem in that a charging time is longer than before.

Meanwhile, although it can be considered that a prescribed number of cell assemblies are charged at one time, as the user who uses the battery device using the SCAT can optionally select a number of cell assemblies used, in the event that only a fixed number of cell assemblies can ever be selected, it creates inconvenience for the user. That is, it is desirable that, even when a charging is carried out, an optional number of cell assemblies can be charged at one time.

An object of the invention is to provide a cordless power tool which has solved (2) of the heretofore described technical problems. Specifically, an object of the invention is to provide a power tool which, having attached thereto the battery device using the SCAT, can prevent damage or the like to the tool even in a case in which the user has selected a battery device not appropriate to the property of the power tool.

In order to achieve the object, the invention has a feature that a power tool, having attached thereto a battery device including one or a plurality of cell assemblies each of which includes a plurality of cells, includes: a motor which is supplied with a DC current from the battery device; a switching element which, being connected to the motor, controls a drive and a stop of the motor; means which detects a number of the cell assemblies; and control means which controls the switching element in accordance with a signal from the detection means.

Another feature of the invention lies in that a power tool, having attached thereto a battery device including one or a plurality of cell assemblies each of which includes a plurality of cells and a cell quantity signal terminal for extracting a signal related to a number of the cells, includes: a motor which is supplied with a DC voltage from the battery device; a switching element connected in series to the motor; and control means which receives the signal from the cell quantity signal terminal, compares values related to a preset number of cells, and controls a turning on and off of the switching element in accordance with a result of the comparison.

Still another feature of the invention lies in that a power tool, having attached thereto a battery device which includes: a first and a second cell assembly each including a plurality of cells; a first signal terminal connected to the first cell assembly; and a second signal terminal connected to the second cell assembly, includes: a motor which is supplied with a DC voltage from the battery device; a switching element connected in series to the motor; and a controller which controls a turning on and off of the switching element, wherein the controller controls the turning on and off of the switching element in accordance with signals from the first signal terminal and the second signal terminal.

Still another feature of the invention lies in that a battery device, used in a cordless power tool which, including at least a first and a second signal input terminal, controls a drive and a stop of a motor in accordance with a signal applied to the signal input terminals, includes: a first cell assembly including: a collection of cells including a plurality of cells; a cell quantity signal output terminal which transmits a signal corresponding to a number of the cells in the collection of cells; and a cell quantity signal input terminal which receives a signal corresponding to a number of cells in another collection of cells, wherein a wiring is furnished which connects the cell quantity signal output terminal of the first cell assembly to the first signal input terminal of the cordless power tool, and connects the cell quantity signal input terminal to the second signal input terminal.

Still another feature of the invention lies in that a battery device, used in a cordless power tool which, including at least a first and a second signal input terminal, controls a drive and a stop of a motor in accordance with a signal applied to the signal input terminals, includes: at least a first and a second cell assembly, wherein the first cell assembly includes a first collection of cells including a plurality of cells, a first cell signal output terminal which transmits a signal indicating a connection of the first collection of cells, a first cell signal input terminal to which is applied a signal from another cell assembly, and a wiring which connects the first cell signal output terminal to the first signal input terminal of the cordless power tool, and connects the first cell signal input terminal to the second signal input terminal, and wherein the second cell assembly includes a second collection of cells including a plurality of cells, a second cell signal output terminal which transmits a signal indicating a connection of the second collection of cells, a second cell signal input terminal to which is applied a signal from another cell assembly, and means which connects the second cell signal output terminal to the first cell signal input terminal of the first cell assembly.

Still another feature of the invention lies in that a battery device includes: a collection of cells having a plurality of cells connected in series; a resistor connected to the collection of cells; a discharge terminal for extracting a voltage at both ends of the collection of cells to an exterior; and at least one signal input terminal, and a first and a second signal output terminal, wherein the first signal output terminal is connected to the resistor, and the signal input terminal is connected to the second signal output terminal.

Other features of the invention are still more clearly understood by the following description.

According to the invention, the following advantages are obtained.

(1) As an optional number of cell assemblies can be attached to the power tool, it is possible to provide a cordless power tool for which the user himself/herself can select a current capacity (Ah).

(2) As an optional number of cell assemblies can be attached to the power tool, it is possible for the user himself/herself to adjust a weight of the power tool.

(3) In the event that the user has selected a battery device not appropriate to the property of the power tool, as the tool itself judges the inappropriateness and does not allow the motor to operate, damage will not be done to the power tool.

BEST MODE FOR CARRYING OUT OF THE INVENTION

Hereafter, a description will be given, with reference to the drawings, of (1) a configuration of a battery device used for the invention, (2) a configuration of a power tool body according to the invention, and (3) a configuration of a charger of the battery device used in the tool of the invention, in the order named.

(1) Configuration of Battery Device
(1.1) Circuit Configuration

Figure 3:
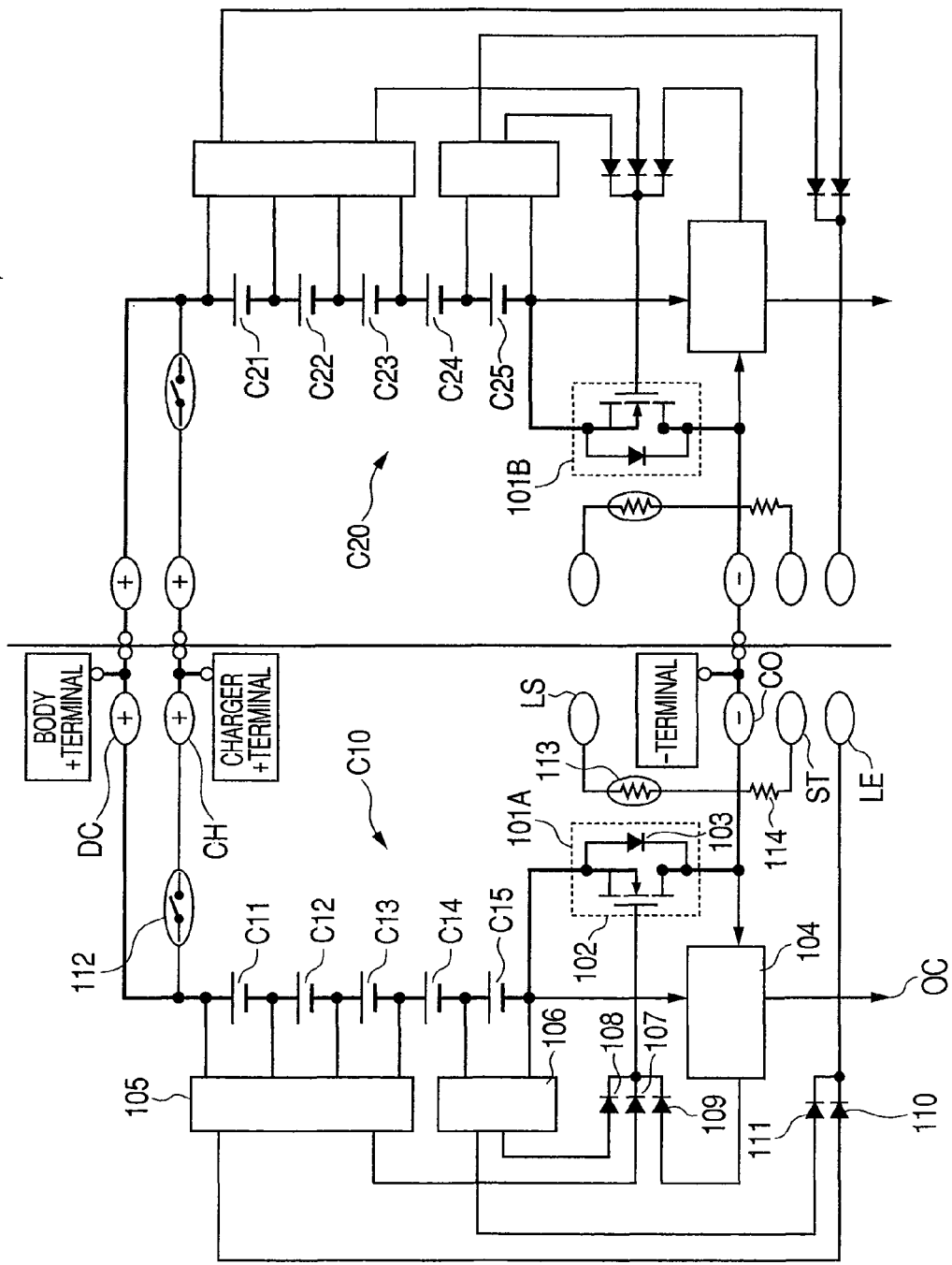
FIG. 3 is a circuit diagram showing an embodiment of a battery device used in a power tool according to the invention.

A description will be given of cell assemblies configuring the battery device used in the power tool according to the invention. FIG. 3 shows an electrical circuit diagram in which cell assemblies 100A and 100B are connected in parallel. As an electrical circuit of the cell assembly 100A is identical to that of 100B, a description will be given of only the electrical circuit of one cell assembly 100A.

In the embodiment, the cell assembly 100A includes five lithium cells C11 to C15 connected in series. The cells C11 to C15 are referred to as a collection of cells C10.

A positive terminal of the collection of cells C10 is connected to a discharge positive terminal DC, and a negative terminal of the collection of cells C10 is connected to a common negative terminal CO via a switching element 101. In the embodiment, the switching element 101 is configured of an FET 102 and a diode 103 connected between a source and a drain of the FET 102.

Figure 1A:
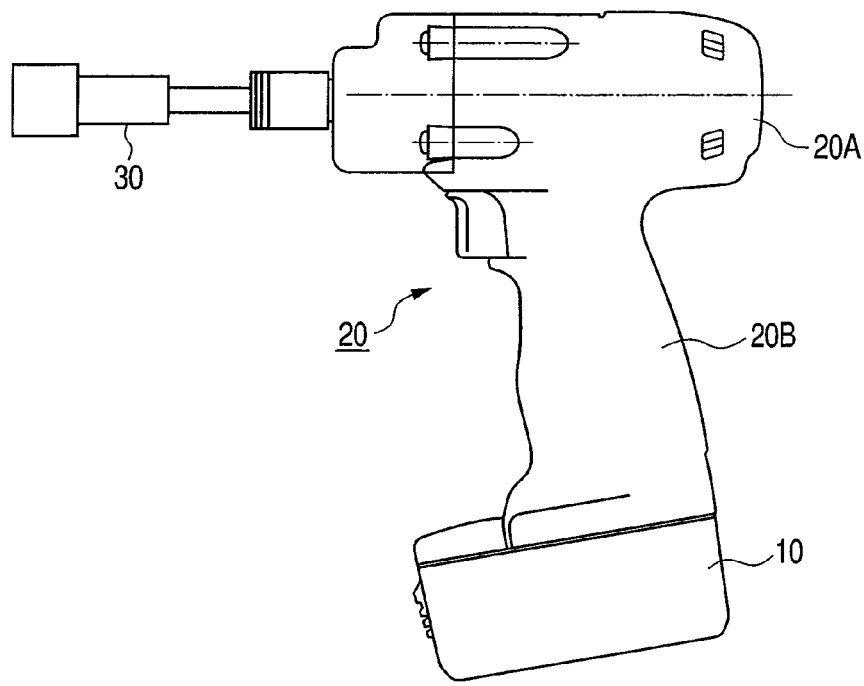
FIGS. 1A-1D is an illustration for illustrating a concept of the invention.
Figures 1B, 1C, 1D:
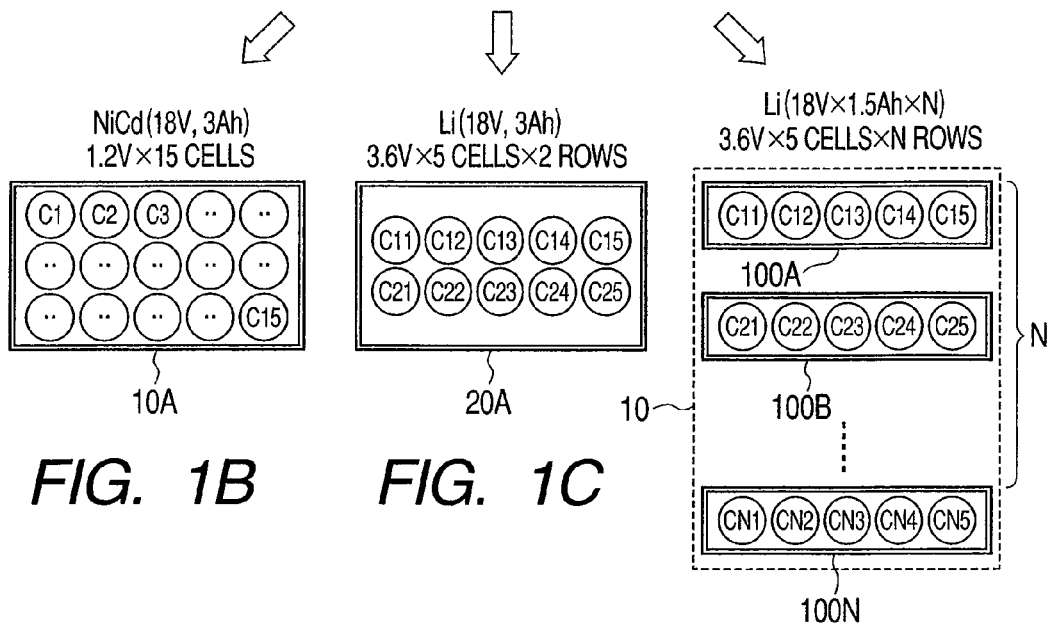
Figure 2A:
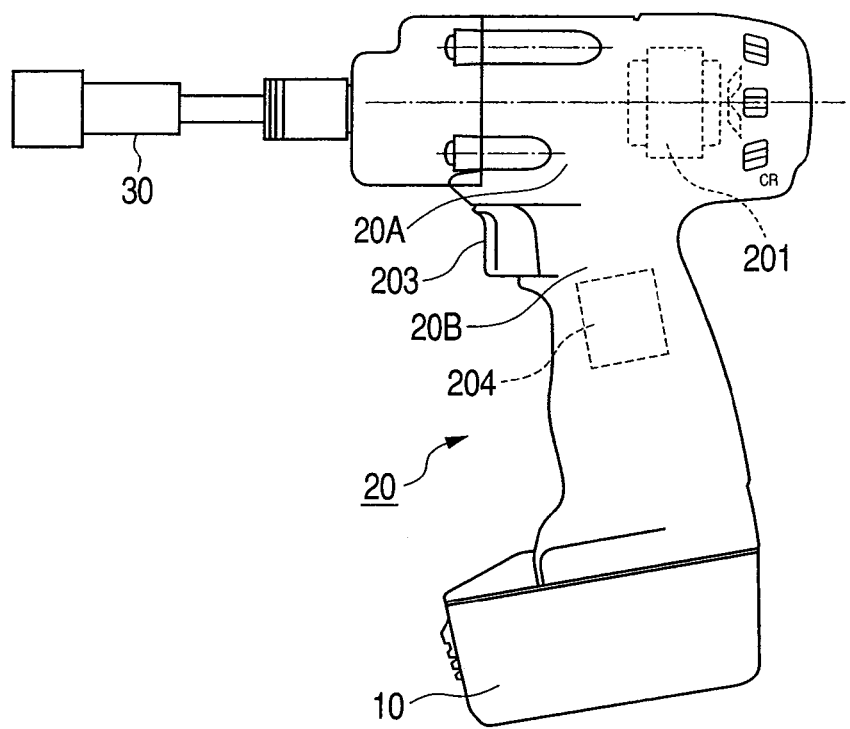
FIG. 2A is as conceptual view of a hitherto known cordless power tool.
Figure 2B:
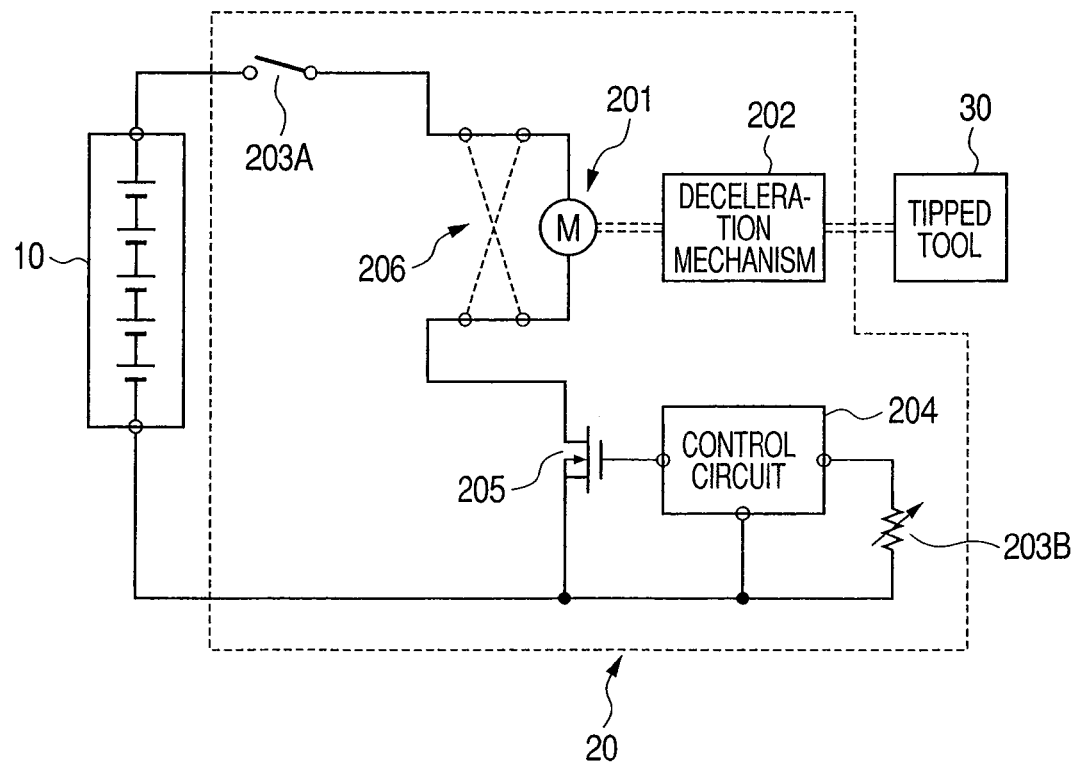
FIG. 2B is an illustration of a motor current of the hitherto known cordless power tool.

104 depicts an overcurrent detection circuit, being connected between a source and a drain of the switching FET 102, which transmits a signal proportional to a size of a current flowing between the source and the drain. The output signal from the overcurrent detection circuit 104, as well as being applied to a gate of the switching FET 102 via a diode 109, is led to an overcurrent signal detection terminal OC. A signal from the terminal OC is applied, as necessary, to a control circuit 204 (FIG. 2B) of a cordless power tool or a microcomputer 530 (FIG. 6B) of a charger 50.

Meanwhile, the lithium cells C11 to C15 are connected to protection circuits 105 and 106 for protecting the cells. As the protection circuit, for example, an IC from Mitsumi Electric Co., Ltd. (MM1414, MM3090 or the like) is used. The protection IC, including a maximum of four input terminals, is configured in such a way to generate an output signal when a prescribed voltage or higher is applied to any one of the input terminals. Output signals from the protection circuits 105 and 106 are led respectively through diodes 110 and 111 to an overvoltage detection terminal LE. A signal from the terminal LE is applied to the microcomputer 530 (FIG. 6B) of the charger 50 to be described hereafter. Also, the output signals from the protection circuits 105 and 106 are applied respectively via diodes 107 and 108 to the gate of the switching FET 102. A thermistor 113 for detecting a temperature of the collection of cells C10 is connected to the source or the drain of the switching element 101. A temperature detection signal therefrom is led to a signal terminal LS and applied to the microcomputer 530 (FIG. 6B) of the charger 50 to be described hereafter.

Also, a resistor 114 has a resistance value which, representing a number of cells in the collection of cells C10, differs according to the number of cells. An electrical signal corresponding to the resistance value of the resistor 114 is led to a cell quantity signal detection terminal ST and applied to the microcomputer 530 (FIG. 6B) of the charger 50 to be described hereafter. A thermostat 112 is connected between the positive terminal of the collection of cells C10 and a charging terminal CH and, when the cell assembly 100A reaches a prescribed temperature or higher, the thermostat 112 operates, stopping a charging.

When the cell assembly 100A and the cell assembly 100B configured as described heretofore are connected in parallel as shown in FIG. 3, for example, as in a case in which one collection of cells C10 is fully charged and an amount of charge in the other collection of cells C20 is 0, in the event that there is a significant difference in voltage between the collection of cells C10 and the collection of cells C20, there is a possibility that, when the FET 120 is on, an overcurrent flows through closed circuits inclusive of the collections of cells C10 and C20, the switching element 101A and a switching element 101B. Also, in a case in which a voltage between the terminals DC and CO is supplied to a motor 201 shown in FIG. 2B, in the event that a load on the motor 201 is heavy, there is a possibility that the overcurrent flows through the cell assemblies 100A and 100B.

However, according to the battery device of the invention, when the overcurrent flows through the collection of cells C10, a voltage between the source and the drain of the switching element 101 increases and, when the voltage reaches a prescribed value or higher, the overcurrent detection circuit 104 generates an output signal. The output signal is applied to the gate of the switching FET 102 via the diode 109, shutting off the FET 102. As a result, the overcurrent is prevented from flowing through the collection of cells C10 and damaging it.

Also, when any one cell in the collection of cells C10 is charged to a prescribed value of voltage or higher during the charging, the output signals are generated by the protection circuits 105 and 106, similarly shutting off the FET 102. Consequently, it is also possible to prevent the cells C11 to C15 from being overcharged.

(1.2) Configuration of Cell Assemblies

Figure 4A:
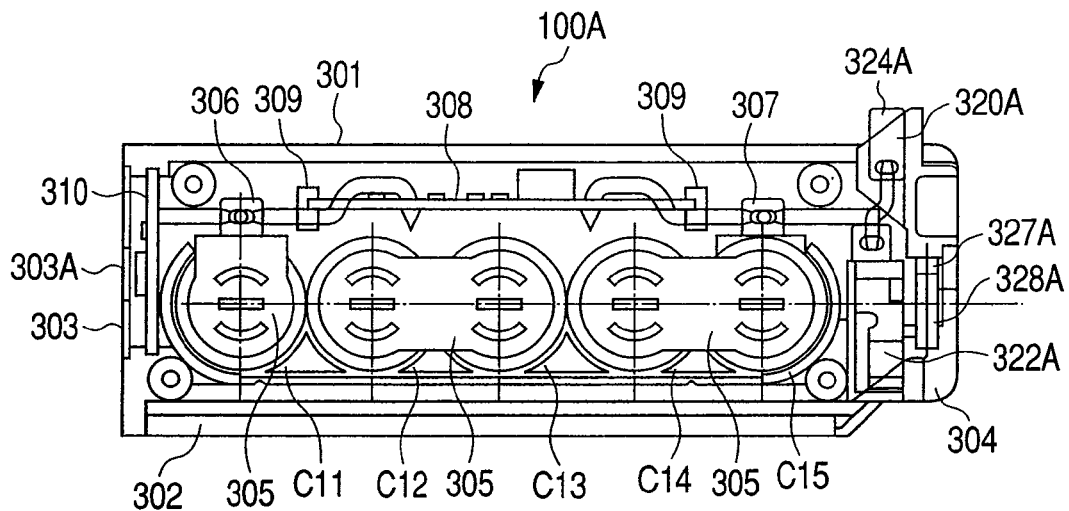
FIG. 4A is a sectional view showing an embodiment of cell assemblies configuring the battery device used in the power tool according to the invention.

Next, a description will be given, with reference to FIGS. 4A to 4E, of a configuration of the cell assemblies of the battery device. As shown in FIG. 4A, a cell housing container is configured of an upper plate 301, a lower plate 302 and both side plates 303 and 304, and the five lithium cells are disposed in the container. The individual cells C11 to C15 being connected in series by a terminal plate 305, a positive electrode of the cell C11 is connected to a terminal 306, and a negative electrode of the cell C15 is connected to a terminal 307. A circuit substrate 308 is disposed in a space between the upper plate 301 and the collection of cells C11 to C15, and is supported by a support member 309. The circuit elements 101 to 111 shown in FIG. 3 are mounted on an upper surface of the circuit substrate 308.

Figure 4B:
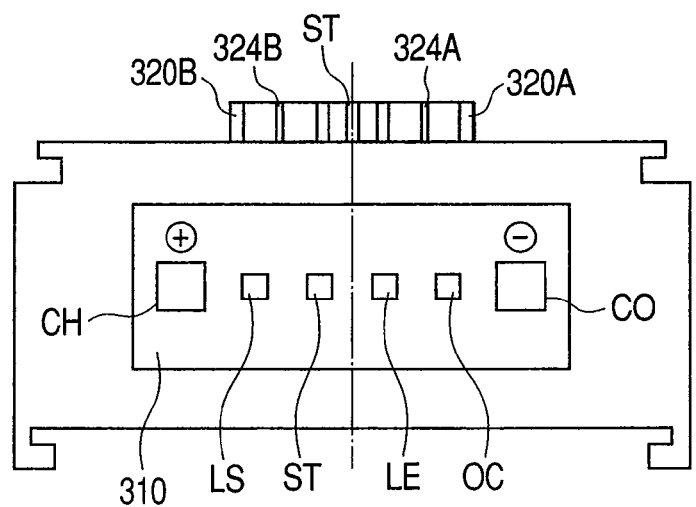
FIG. 4B is a side view of the cell assemblies configuring the battery device used in the power tool according to the invention.

Meanwhile, a charging terminal substrate 310 is disposed adjacent to the side plate 303 and, as shown in FIG. 4B, the charging positive and negative terminals CH and CO, and the signal detection terminals LS, ST, LE and OC, are provided on the substrate. An opening 303A is provided in a portion of the side plate 303 in FIG. 4A, and a voltage can be applied to the terminals CH and CO through the opening 303A.

A first engagement member 320A for bringing the cell assembly 100A into engagement with the other cell assembly 100B (not shown) is provided on the side plate 304 on the right hand in FIG. 4A in such a way as to be movable up and down. The first engagement member 320A includes an extending portion 327A extending downward in the figure, and the extending portion is inserted into a hole 328A. A spring (not shown), being provided in the hole 328A, is configured in such a way as to push the first engagement member 320A upward into engagement with a second engagement member 322A of the other cell assembly to be described hereafter.

Figure 4C:
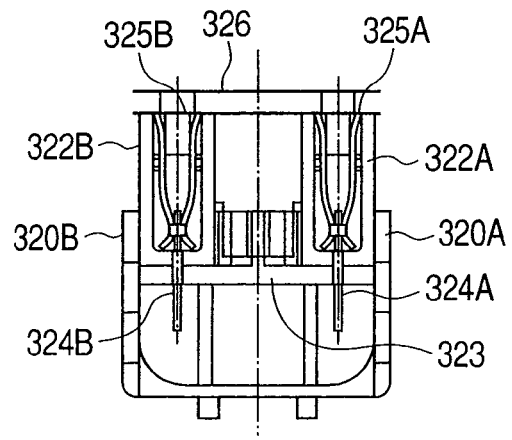
FIG. 4C is A sectional view of a connection between the cell assemblies configuring the battery device used in the power tool according to the invention.

Although FIG. 4A shows one first engagement member 320A, another is provided at the back of the plane of the figure and, as shown in FIG. 4B, two first engagement members 320A and 320B are provided. As shown in FIG. 4C, the first engagement members 320A and 320B are attached to a support member 323, and two metal plates 324A and 324B are vertically provided in the support member 323.

In the other cell assembly 100B, the second engagement member 322A and a second engagement member 322B are attached to a support member 326, and metal plates 325A and 325B are provided inside the engagement members 322A and 322B. When the second engagement members 322A and 322B are engaged with the first engagement members 320A and 320B as shown in FIG. 4C, the other metal plates 324A and 324B are inserted in the metal plates 325A and 325B, connecting the two cell assemblies 100A and 100B.

As shown in FIG. 4A, the positive terminal 306 of the cell C11 is connected to the metal plates 324A and 325A via a wiring on the circuit substrate 308, and the negative terminal 307 of the cell C15 is connected to the metal plates 324B and 325B (FIG. 4C). In the same way, a positive terminal (not shown) of a cell C21 in the cell assembly 100B is connected to the metal plates 325A and 324A, and a negative terminal (not shown) of a cell C25 is connected to the metal plates 325B and 324B. Consequently, when the metal plate 324A of the assembly 100A is connected to the metal plate 325A of the assembly 100B, and the metal plate 324B of the assembly 100A is connected to the metal plate 325B of the assembly 100B, the two cell assemblies 100A and 100B become connected in parallel.

By the metal plates 324A and 324B serving as discharge terminals being provided on the first engagement members 320A and 320B urged upward by the spring as described heretofore, a force acts which presses the metal plates 324A and 324B constantly toward the metal plates 325A and 325B serving as discharge terminals of the other cell assembly. For this reason, a contact between the metal plates 324A and 325A, and 324B and 325B can be kept stable even when the cordless power tool vibrates.

Figure 4D:
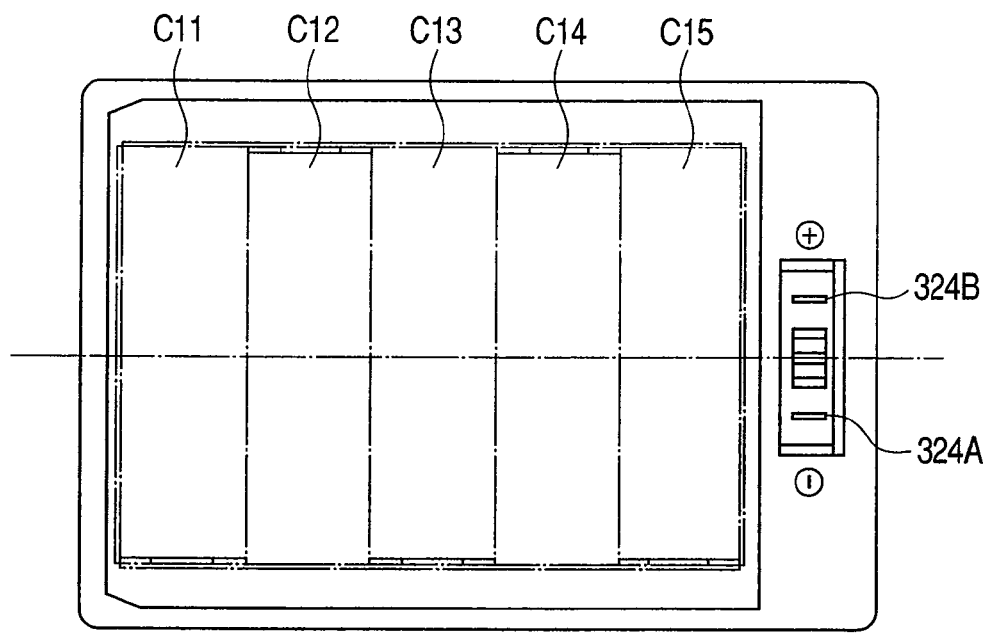
FIG. 4D is a top view of the cell assembly configuring the battery device used in the power tool according to the invention.

FIG. 4D shows a top view of the cell assembly 100A. The first engagement member provided with the discharge positive terminal 324A connected to the positive terminal of the cell C11 and the discharge negative terminal 324B connected to the negative terminal of the cell C15 is disposed on an upper surface of the cell assembly container and, in the same way, the second engagement member provided with the discharge positive terminal 325A and the discharge negative terminal 325B is disposed on a lower surface opposite the upper surface.

Meanwhile, as the charging terminal of the cell C10 is provided on a side surface instead of the upper and lower surfaces of the container, it is possible to charge the cell assemblies 100A and 100B in a condition in which the cell assemblies 100A and 100B are stacked one on the other and connected in parallel.

Figure 4E:
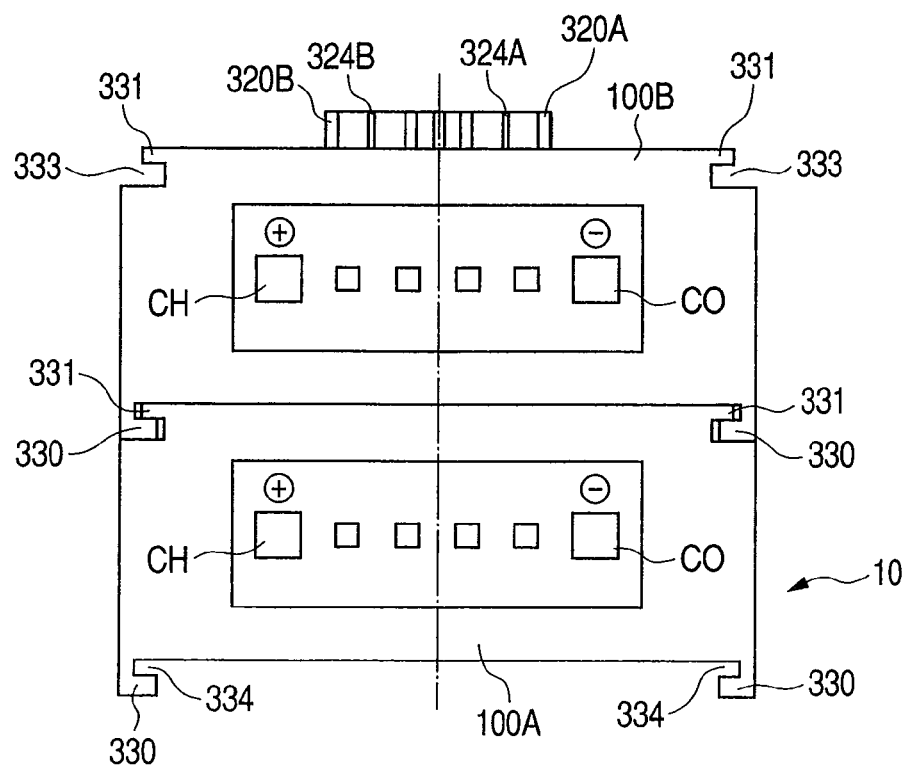
FIG. 4E is a schematic view of the battery device in which the cell assemblies used in the power tool according to the invention are stacked one on the other.

FIG. 4E shows the battery device 10 having the two cell assemblies 100A and 100B stacked one on the other. A slide rail formed by a projection 331 and a recess 333 is provided at each of upper surface ends of the cell assemblies 100A and 100B, and a slide rail formed by a projection 330 and a recess 334 is provided at each of lower surface ends. The lower slide rails of the cell assembly 100B are engaged with the upper rails of the cell assembly 100A, thereby forming the battery device 10 configured of the two cell assemblies 100A and 100B.

(2) Configuration of Power Tool Body

Next, a description will be given, with reference to FIG. 5A, of a connection of the cordless power tool and the battery device 10 according to the invention.

Although, as described heretofore, the cordless power tool according to the invention is configured in such a way that a user can select a current capacity (Ah) for it, depending on the tool, unless a battery device having a prescribed value of current capacity or higher is used, the battery device is likely to be damaged. For example, in a case of a driver drill, when a tipped tool 30 in FIG. 2B bites a workpiece, an excessive current flows through a motor 201 and, in the event that the current capacity (Ah) of the battery device 10 is low, heavy damage may be done to cells. For this reason, a tool body of the invention is provided with a control circuit which allows the tool not to operate in a case in which a battery having a lower current capacity than a necessary current capacity is attached to the tool.

Figure 5A:
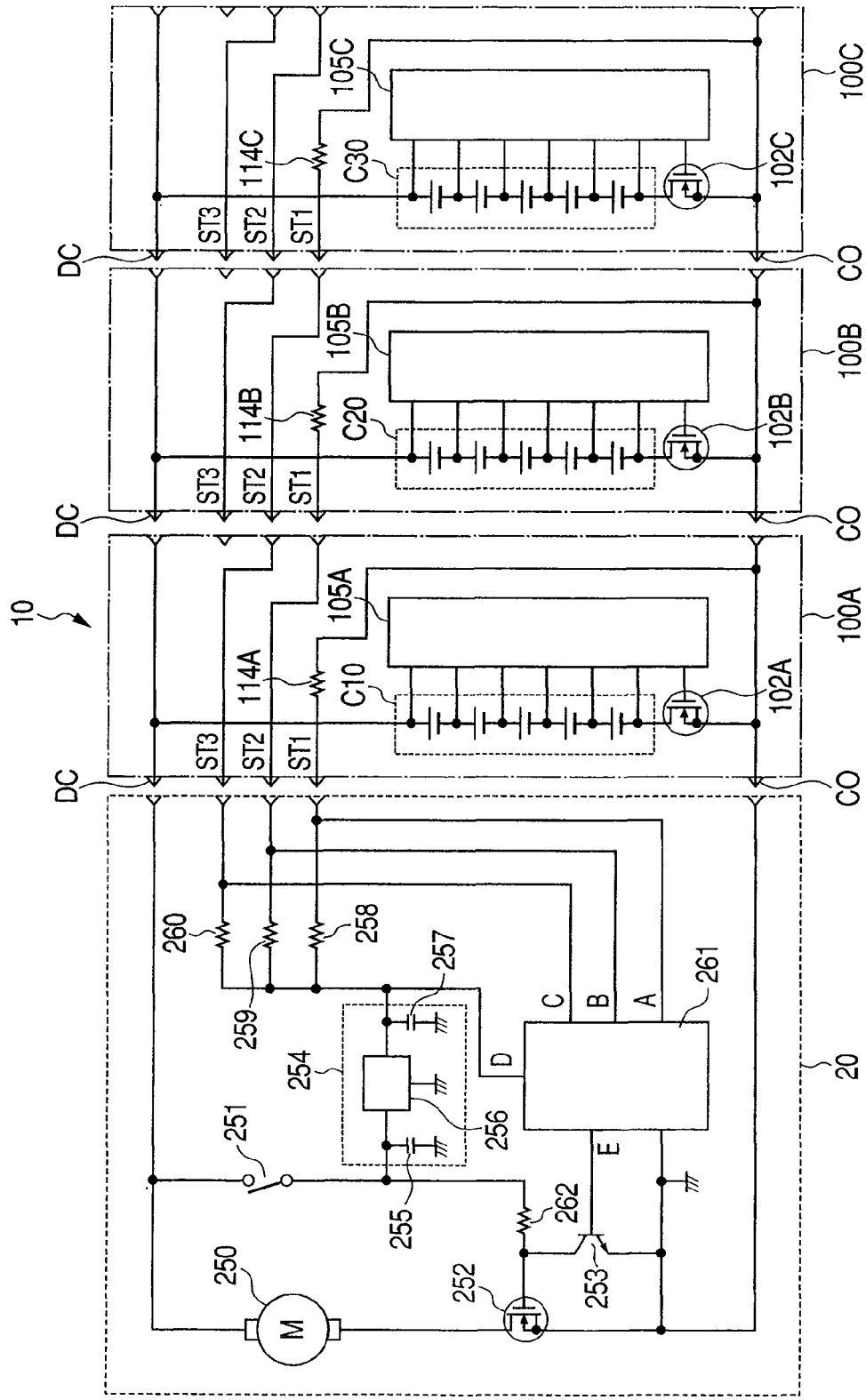
FIG. 5A is an electrical circuit diagram when a cordless power tool according to the invention is connected to the battery device.

An embodiment shown in FIG. 5A shows an example in which a battery device 10 including three cell assemblies 100A, 100B and 100C is attached to a power tool body 20. A motor 250 and a switching FET 252 are connected in series between a discharge positive terminal DC and a negative terminal CO of the battery device 10. Also, the positive terminal DC is connected to a gate of the switching EFT 252 and a collector of a transistor 253 via a trigger switch 251 and a resistor 262. A source of the EFT 252 and an emitter of the transistor 253 are connected in common and grounded. Also, a base of the transistor 253 is connected to an output terminal of a control circuit 261.

254 depicts a constant voltage power supply, which is configured of a regulator 256 and capacitors 255 and 257. An output voltage V0 of the constant voltage power supply 254 is supplied to the control circuit 261.

Meanwhile, resistors 114A, 114B and 114C for determining a number of cells as shown in FIG. 3 are connected to the cell assemblies 100A, 100B and 100C, respectively. The resistor 114 has a resistance value which differs according to the number of cells configuring the cell assembly 100. Consequently, in the event of detecting the resistance value, it is possible to determine the number of cells configuring the cell assembly 100. In the embodiment, a value of the resistors 114A, 114B and 114C when the number of cells is 5 is designated by R1.

A detection terminal ST1 of the cell assembly 100C is connected to a detection terminal ST2 of the cell assembly 100B, and a detection terminal ST1 and the detection terminal ST2 of the cell assembly 100B are connected to detection terminals ST2 and ST3 of the cell assembly 100A, respectively.

Consequently, it follows that the cell quantity determination resistors 114A, 114B and 114C are connected to a detection terminal ST1 and the detection terminals ST2 and ST3 of the cell assembly 100A, respectively. The detection terminals ST1, ST2 and ST3 of the cell assembly 100A, as well as being connected to a power supply voltage terminal D of the control circuit 261 via pull-up resistors 258, 259 and 260 respectively, are connected to input terminals A, B and C. When a value of each of the pull-up resistors 258, 259 and 260 is designated by R2, the output voltage of the constant voltage power supply 254 by V0, and the resistance of the cell quantity determination resistor 114 by R1, a voltage of $R1/(R1+R2)V0$ is applied to each of the terminals A, B and C. Also, in a case in which no cell assembly is connected, the voltage V0 is applied to the terminals A, B and C.

At this point, supposing, for example, that R1 is 100Ω, R2 is 10 kΩ and V0 is 5V, in the case in which the cell assembly 100 is connected, a voltage approximate to 0V is applied to the input terminals (A, B, C) while, in the case in which the cell assembly 100 is not connected, a voltage approximate to 5V is applied to the input terminals (A, B, C). Consequently, in the event that a voltage applied to the terminals (A, B, C) at a threshold intermediate between 5V and 0V is binarized, it is possible to obtain a number of cell assemblies connected as a binarized signal. Supposing, for example, that a high level is 1 (HIGH) and a low level is 0 (LOW), when (A, B, C) is (0, 1, 1), it shows that one assembly is connected and, in cases of (0, 0, 1) and (0, 0, 0), the control circuit 261 can recognize that two and three assemblies are connected, respectively. The control circuit 261 is configured in such a way as to compare a preset value of (A, B, C) with an input value of (A, B, C) and generate an output signal to an output terminal E in accordance with a result of the comparison. The output terminal E is set in advance, for example, in such a way as to have 0 (LOW) when (A, B, C) is (0, 0, 0) and (0, 0, 1), and 1 (HIGH) when (A, B, C) is (0, 1, 1) and (1, 1, 1).

In the embodiment, a configuration is such as to vary the resistance of the cell quantity determination resistor 114 according to the number of cells but, as it is sufficient to be able to identify a presence or an absence of the cell assembly, it is acceptable to make it a mere fixed resistance.

Next, a description will be given of an operation of the circuit shown in FIG. 5A. When the user turns on the trigger switch 251, as a positive voltage of the battery device 10 is applied to the switching FET 252 via the switch 251 and the resistor 262, the FET 252 is turned on.

Meanwhile, the control circuit 261, based on a size of a signal input into the input terminals A, B and C, detects a number of cell assemblies 100 connected. Then, in a case in which a necessary number of cell assemblies are not connected to the tool 20, a signal of 1 is issued from the output terminal E. Based on the signal, the transistor 253 is turned on. As a result, the switching FET 252 is short circuited between the gate and the source, and turned off. That is, in a case in which a smaller number of cell assemblies than the preset number are connected to the control circuit 261, the tool 20 is controlled not to operate.

Figure 5B:
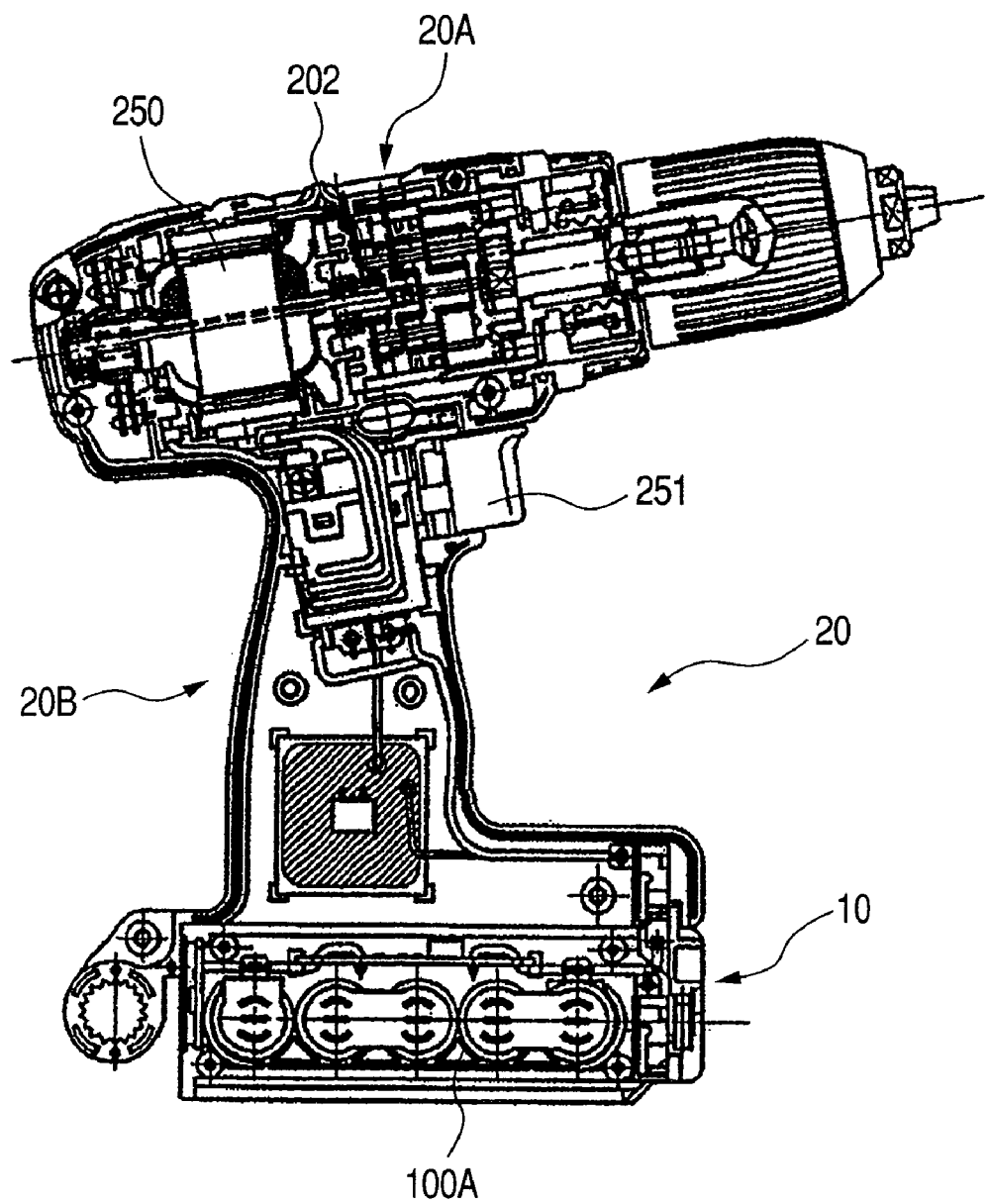
FIG. 5B is a sectional view of the cordless power tool according to the invention having one cell assembly attached thereto.
Figure 5C:
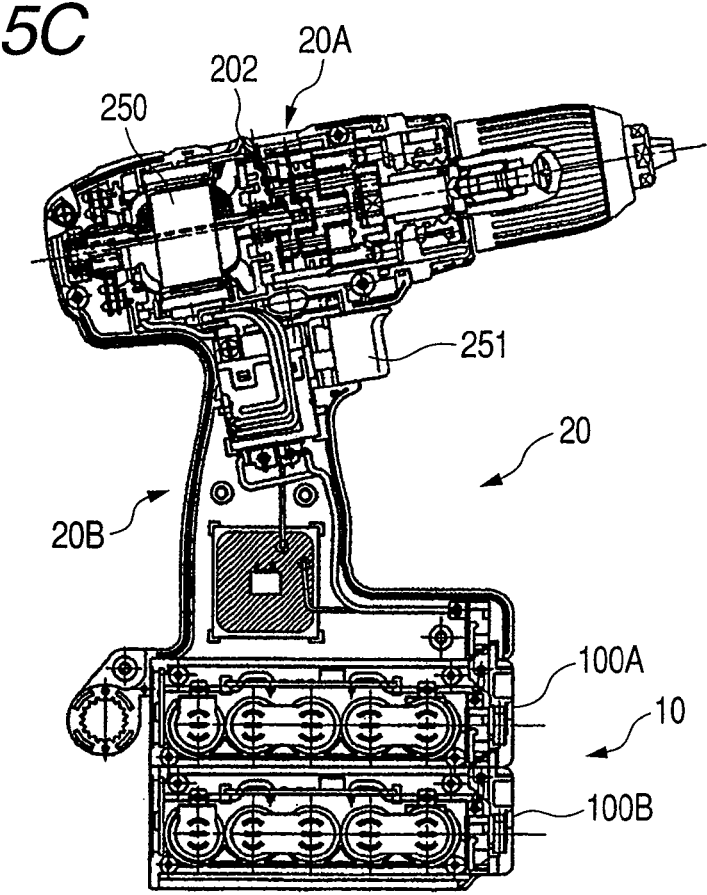
FIG. 5C is a sectional view of the cordless power tool according to the invention having two cell assemblies attached thereto.

FIG. 5B showing a sectional view of the power tool 20 according to the invention, the motor 250, a deceleration mechanism 202 and the like are housed in a main body 20A, and the battery device 10 is attached to an end of a handle 20B. Also, FIG. 5C shows an example in which two cell assemblies 100A and 100B are attached as the battery device 10.

(3) Configuration of Charger

Figure 6A:
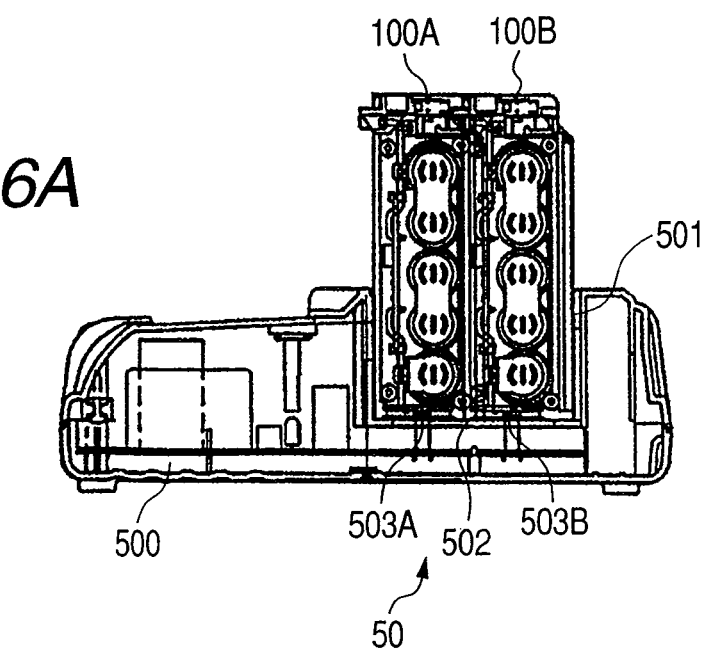
FIG. 6A is a sectional view of a charging device which charges the battery device used in the power tool according to the invention.

Next, a description will be given, with reference to FIGS. 6A and 6B, of a charger which charges the battery device used in the power tool according to the invention. A charger 50 is configured of a body 500 and a cell container 501. A configuration is such that a plurality of cell assemblies 100 can be contained in the cell container 501. In the embodiment, an example is shown in which the cell container 501 can contain two cell assemblies 100A and 100B, but it is designed in such a way as to be able to contain an optional number of cell assemblies equal to or larger than two.

Terminal plates 503A and 503B are installed on a bottom surface 502 of the cell container 501. Each of the terminal plates 503A and 503B is provided with individual terminals to make contact with the charging positive terminal CH, charging negative terminal CO and signal terminals LS, ST, LE and OC shown in FIG. 4B.

Figure 6B:
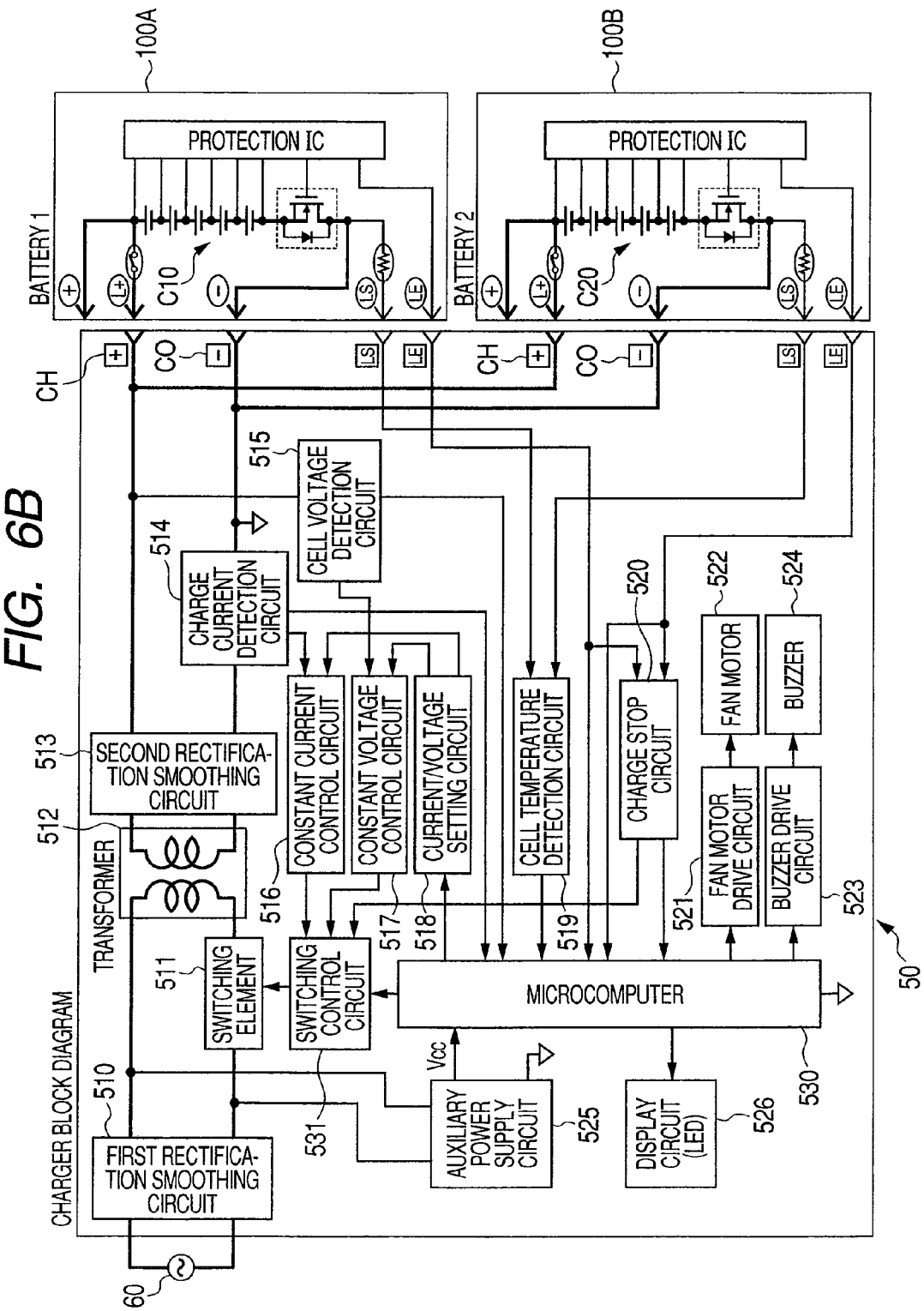
FIG. 6B is an electrical circuit diagram of the charging device which charges the battery device used in the power tool according to the invention.

FIG. 6B shows an electrical circuit of the charger 50. A voltage of a commercial AC power supply 60, after being converted into a direct current voltage by a rectification smoothing circuit 510, is applied to a transformer 512 via a switching element 511. By controlling an on time of the switching element 511, it is possible to control a size of an average voltage appearing in a secondary wiring of the transformer 512.

The voltage of the secondary wiring of the transformer 512, after being converted into a direct current voltage again by the rectification smoothing circuit 513, is applied to the charging positive terminals CH and charging negative terminals CO of the cell assemblies 100A and 100B, charging the collections of cells C10 and C20 in the assemblies 100A and 100B.

A size of a charge current equivalent to a sum of a charge current of the cell assembly 100A and a charge current of the cell assembly 100B is detected by a charge current detection circuit 514 connected to the secondary wiring of the transformer 512, and the charge current is applied to the microcomputer 530.

Meanwhile, a terminal voltage of the collections of cells C10 and C20 in the cell assemblies 100A and 100B is detected by a cell voltage detection circuit 515, and applied to the microcomputer 530.

Also, a signal indicating a temperature of the collections of cells C10 and C20 in the cell assemblies 100A and 100B is applied to a cell temperature detection circuit from the terminals LS, and an output signal therefrom is applied to the microcomputer 530. Also, when an overvoltage detection signal appears in the signal terminals LE, it is applied to the microcomputer 530 and simultaneously to a charge stop circuit 520. The charge stop circuit 520, on receiving the overvoltage detection signal, transmits an output signal to a switching control circuit 531, placing the switching element 511 in an off state.

A fixed power supply voltage Vcc generated by an auxiliary power supply circuit 525 is applied to the microcomputer 530. Also, based on various kinds of detection signals received, a signal indicating a set voltage and a set current is transmitted to a current/voltage setting circuit 518. A constant current control circuit 516 compares the set voltage of the setting circuit 518 and the charge current from the charge current detection circuit 514, and controls a turning on and off of the switching element 511 in such a way that the charge current becomes equal to the set current. In the same way, a constant voltage control circuit 517 compares the set voltage of the setting circuit 518 and a cell voltage from the cell voltage detection circuit 515, and controls the turning on and off of the switching element 511 in such a way that the cell voltage becomes equal to the set voltage.

Also, the microcomputer 530 transmits a signal to a display circuit 526, displaying a charging operation, and transmits a signal to a fan motor drive circuit 521, driving a fan motor 522. Furthermore, it transmits a signal to a buzzer drive circuit 523, sounding a necessary buzzer 524.

Figure 6C:
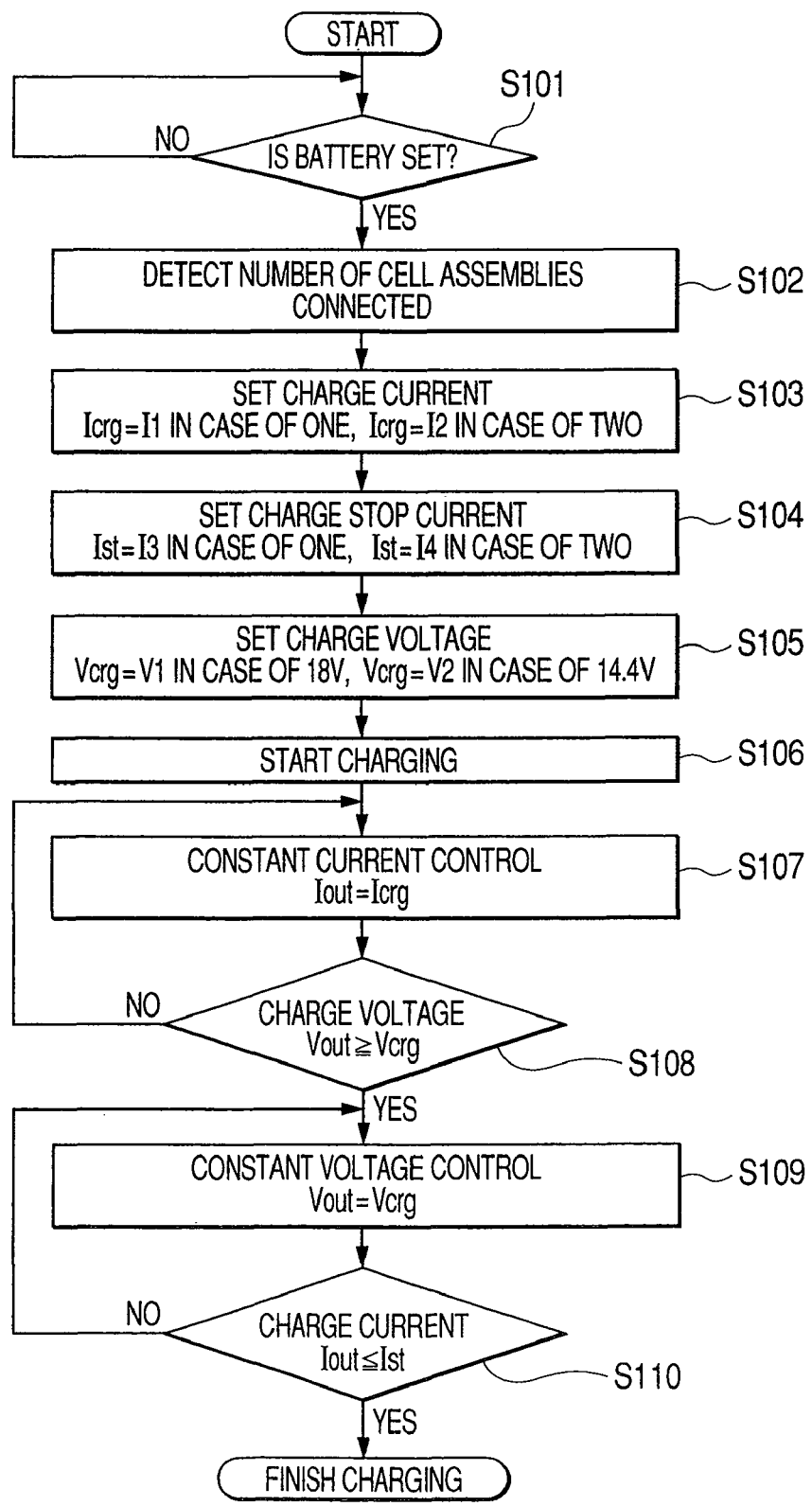
FIG. 6C is a flowchart showing a control flow of the charging device which charges the battery device used in the power tool according to the invention.

Next, a description will be given, with reference to FIG. 6C, of a control flow of the charger described heretofore.

First, in step S101, it is determined whether or not the cell assemblies 100A and 100B are set on the charger 50. If they are set, in step S102, a number of cell assemblies connected to the charger 50 is detected. Although there are various methods for the detection, for example, when the detection circuit 519 receives signals from two LS terminals, it is determined that the number of cell assemblies is two while, when it receives a signal from one LS terminal, it is determined that the number of assemblies is one.

In step S103, a setting of a charge current Icrg is carried out in accordance with a number of cell assemblies 100 connected. For example, when the number of cell assemblies 100 connected is one, I1 is set and, when it is two, I2 is set. Normally, I2 is assigned a value twice that of I1. Furthermore, in step S104, a setting of a charge stop current to finish a charging is carried out. In a case of charging a nickel-cadmium cell or a nickel-metal-hydride cell, it is common that the cell voltage and the cell temperature are detected, and a time to finish the charging is determined based on the detected values while, in a case of charging a lithium cell, the charge current is detected, and a time to finish the charging is determined.

In step S105, a setting of the charge voltage is carried out. For example, when the voltage of the cell assembly 100 is 18V, the charge voltage is set at a value of V1 and, when the voltage of the cell assembly 100 is 14.4V, it is set at a value of V2.

Next, in step S106, the charging is started and, at first, a constant current control is carried out (S107). That is, a current Iout flowing through the cell assembly 100 is controlled in such a way as to reach a fixed current value Icrg. In step S108, it is determined whether or not a charge voltage Vout of the cell assembly 100 has reached a preset charge voltage Vcrg and, if a result of the determination is YES, in step S109, the control is switched to the constant voltage control. That is, in the case of charging the lithium cell, the constant current control is carried out at first and, after the cell is charged to a prescribed voltage, the constant voltage control is carried out. After the control is switched to the constant voltage control, the charge current Iout of the cell assembly 100 decreases gradually and, it being determined whether or not the charge current has reached a preset charge stop current Ist (S110), if a result of the determination is YES, the charging is finished.

As described heretofore, in a charging device of the invention, the charge current and the charge stop current which differ according to a number of cell assemblies connected are set.

In the heretofore described embodiments of the invention, it is easy to make various modifications unless they change the basic idea of the invention, and such modifications are included in the invention. For example, in FIG. 3, the overcurrent detection circuit 104 is configured in such a way as to detect the voltage between the source and the drain of the switching FET 102, but it is acceptable to configure in such a way as to bring a fixed resistor into serial contact with the collection of cells C10, and detect a voltage at both ends of the fixed resistor. Also, it is necessary that the switching FET 102 is provided in each of the collections of cells, but it is also acceptable that they are provided outside the cell container.

The invention claimed is:

1. A battery device comprising:
   a battery device including one or a plurality of cell assemblies each of which includes a plurality of cells;
   a cordless power tool to be connected to the battery device, the cordless power tool including a motor which is supplied with a DC current from the battery device;
   a switching element which, being connected to the motor, controls a drive and a stop of the motor;
   means which detects a connection state of the cell assemblies; and
   control means which controls the switching element in accordance with a signal from the detection means,
   wherein the control means controls the switching element not to drive the motor if the detected connection state does not satisfy a use condition of the battery device.

2. A cordless power tool having attached thereto a battery device including one or a plurality of cell assemblies each of which includes a plurality of cells, the tool comprising:
   a motor which is supplied with a DC current from the battery device;
   a switching element which, being connected to the motor, controls a drive and a stop of the motor;
   means which detects a number of the cell assemblies; and
   control means which controls the switching element in accordance with a signal from the detection means,
   wherein the control means, when the number of the cell assemblies is smaller than a prescribed value, controls the switching element in such a way as to stop the drive of the motor.

3. A cordless power tool having attached thereto a battery device including one or a plurality of cell assemblies each of which includes a plurality of cells and a cell quantity signal terminal for extracting a signal related to a number of the cells, comprising:
   a motor which is supplied with a DC voltage from the battery device;
   a switching element connected in series to the motor; and
   control means which receives the signal from the cell quantity signal terminal, compares values related to a preset number of cells, and controls a turning on and off of the switching element in accordance with a result of the comparison.

4. A cordless power tool having attached thereto a battery device which includes: a first and a second cell assembly each including a plurality of cells; a first signal terminal connected to the first cell assembly; and a second signal terminal connected to the second cell assembly, the tool comprising:

a motor which is supplied with a DC voltage from the battery device;

a switching element connected in series to the motor; and a controller which controls a turning on and off of the switching element, wherein the controller controls the turning on and off of the switching element in accordance with signals from the first signal terminal and the second signal terminal.

5. The cordless power tool according to claim 4, wherein, when the first and second cell assemblies are connected, the controller drives the motor and, when one of the first and second cell assemblies is not connected, it controls the switching element in such a way as not to drive the motor.

6. The cordless power tool according to claim 5, wherein fixed resistors are connected to the first and second terminals of the battery device, a stabilized voltage is generated from the DC voltage of the battery device, and the stabilized voltage is applied to the first and second signal terminals via the resistors, as well as a connection of a first and a second cell assembly device being detected from a voltage of the first and second signal terminals.

7. A battery device used in a cordless power tool which, including at least a first and a second signal input terminal, controls a drive and a stop of a motor in accordance with a signal applied to the signal input terminals, the device comprising: a first cell assembly including:

a collection of cells including a plurality of cells;

a cell quantity signal output terminal which transmits a signal corresponding to a number of the cells in the collection of cells; and a cell quantity signal input terminal which receives a signal corresponding to a number of cells in another collection of cells, wherein a wiring is furnished which connects the cell quantity signal output terminal of the first cell assembly to the first signal input terminal of the cordless power tool, and connects the cell quantity signal input terminal to the second signal input terminal.

8. A battery device used in a cordless power tool which, including at least a first and a second signal input terminal, controls a drive and a stop of a motor in accordance with a signal applied to the signal input terminals, the device comprising:

at least a first and a second cell assembly, wherein the first cell assembly includes a first collection of cells including a plurality of cells, a first cell signal output terminal which transmits a signal indicating a connection of the first collection of cells, a first cell signal input terminal to which is applied a signal from another cell assembly, and a wiring which connects the first cell signal output terminal to the first signal input terminal of the cordless power tool, and connects the first cell signal input terminal to the second signal input terminal, and wherein the second cell assembly includes a second collection of cells including a plurality of cells, a second cell signal output terminal which transmits a signal indicating a connection of the second collection of cells, a second cell signal input terminal to which is applied a signal from another cell assembly, and means which connects the second cell signal output terminal to the first cell signal input terminal of the first cell assembly.

* * * * *